J. C. SCHULTZ & C. T. AMMON.
LAWN TRIMMER.
APPLICATION FILED JULY 28, 1915.
1,182,427.  Patented May 9, 1916.
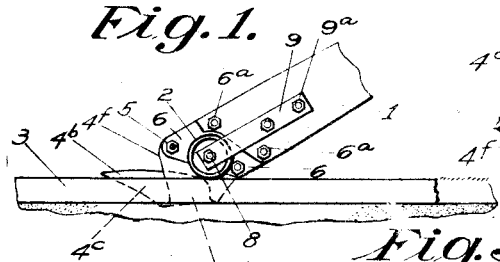
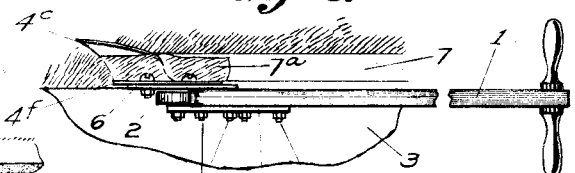
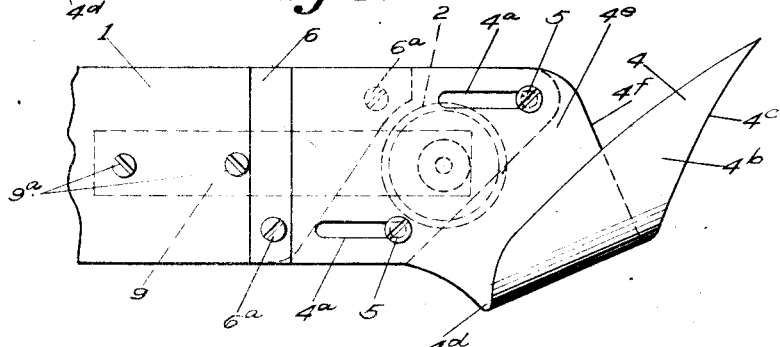
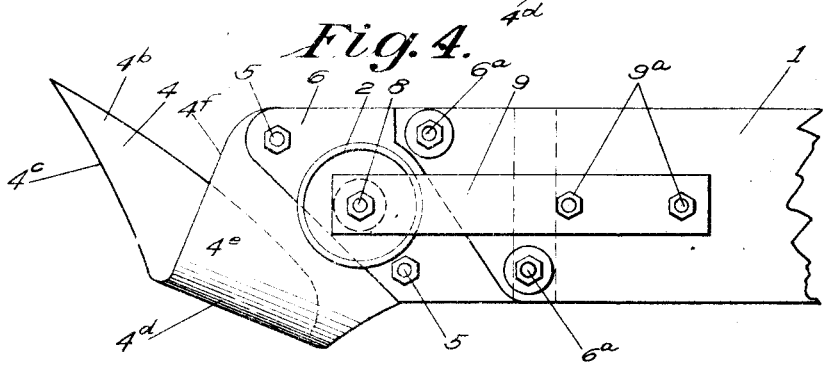
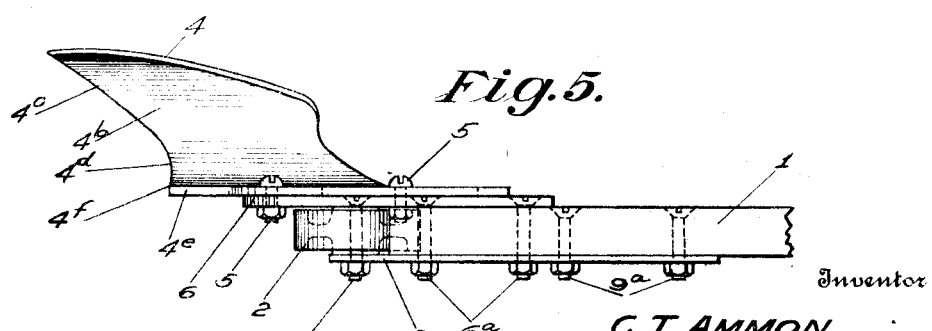
Inventor
C. T. AMMON
JOHN C. SCHULTZ

UNITED STATES PATENT OFFICE.

JOHN C. SCHULTZ AND CHARLES T. AMMON, OF WOOSTER, OHIO.

LAWN-TRIMMER.

1,182,427.  Specification of Letters Patent.  Patented May 9, 1916.

Application filed July 28, 1915. Serial No. 42,315.

*To all whom it may concern:*

Be it known that we, JOHN C. SCHULTZ and CHARLES T. AMMON, citizens of the United States, residing at Wooster, in the county of Wayne and State of Ohio, have invented certain new and useful Improvements in Lawn-Trimmers, of which the following is a specification.

Our invention relates to improvements in lawn trimmers or edgers, the primary object of the invention being to provide a generally improved tool or implement of this class of exceedingly simple, cheap, and efficient construction admirably adapted to be forced along the edge of a foot walk, curbing, side walk, or the like, whereby to simultaneously cut and remove the overlapping turf and form a groove or channel along the edges thereof.

A further object is the provision of an improved cutting and grooving member having a forwardly projecting share section the latter being provided with a rearwardly and downwardly inclined lawn or turf cutting edge adapted to initially cut and return the turf to the grooving portion of the tool, this tool or implement differing from the ordinary form in that the latter has the point of its grooving portion or section extending ahead of the side cutting edges so that the furrow or groove is initially cut or in other words before the turf is removed or cut thus leaving a rough ragged edge.

A still further object is to improve the general construction, arrangement, and adjustment of the parts to meet the varying demands of actual service.

With the above mentioned and other ends in view, the invention consists in the novel construction, arrangement, and combination of parts, hereinafter described, illustrated in one of its embodiments in the accompanying drawings, and particularly pointed out in the appended claim.

Referring to the drawings, forming a part of this specification, Figure 1, is a side elevation of the improved lawn trimmer illustrating its manner of application and use. Fig. 2, a top plan view of the same. Fig. 3, an enlarged detail side elevation of the outer or share side of the same. Fig. 4, a view of the inner or reverse side of same. Fig. 5, an enlarged top plan view of the same.

Similar numerals of reference designate like parts throughout all the figures of the drawings.

The improved lawn trimmer comprises a handle 1, adapted to be supported and carried at its lower end by means of a supporting wheel 2, the latter being adapted to travel upon and along the marginal edge of the adjacent walk or curbing 3, as indicated in Figs. 1 and 2 of the drawings, and carrying with it the improved cutting and grooving member or compound blade 4, constructed and mounted as hereinafter described.

The improved cutting and grooving member 4, is secured to one side of the handle 1, through the medium of adjusting screw bolts 5, secured in a supporting plate 6, the latter being secured to the base or head portion of the handle through the medium of suitable attaching bolts $6^a$. The adjusting bolts 5, in the supporting plate 6, pass through suitable slots $4^a$, in the base or attaching portion of the cutting and grooving member to permit the latter to be adjusted to meet the varying demands of actual service, such as increasing or decreasing the depth and width of the cut-away or channel portion formed by the improved tool.

The cutting and grooving member has an outwardly inclined forwardly projecting share or lawn cutting section or portion $4^b$, said section or portion $4^b$, having a rearwardly and downwardly inclined cutting edge $4^c$, terminating in a channel shaped base section $4^d$, it being the object of the share or lawn cutting section $4^b$, and particularly its "draw cutting" edge $4^c$, to cut and trim the lawn and sod in advance of the grooving section $4^d$, as well as to cut and remove the forward portion and return it to the channel shaped base section of the implement so that the cut-away or trimmed portions of the lawn and sod will be returned into the grooved or channeled part 7, as indicated at $7^a$, in Fig. 2 of the drawings.

The vertically extending section $4^a$, preferably has its cutting edge $4^t$, extending downwardly and rearwardly toward the base section $4^d$, said vertically extending or walk side section being adapted to pass along and be guided by the marginal edge of the walk or curbing 3, (as the case may be) to form the vertically extending edge of the channel or groove 7, at the adjacent or contiguous side thereof. The supporting wheel 2, is mounted and supported, in the present instance, by means of an axle bolt 8, passing through the supporting plate 6, and through a supporting bar 9, secured on the inner side of the handle through the medium of attaching bolts $9^a$.

It will be seen that the improved implement has the point of its share or lawn cutting section well extended forwardly so that the rearwardly and downwardly inclined cutting edge $4^c$ extends at an acute angle and will have an initial draw cutting contact at the surface of the lawn or ground and then finally cut out the bottom of the groove or furrow leaving the sod or cut-away portion rest undisturbed in the furrow or groove thus leaving a clean cut smooth edge as illustrated most clearly in Fig. 2 of the drawings. It will also be observed that the lawn cutting and vertically extending sections $4^b$ and $4^e$, have their cutting edges $4^c$ and $4^f$, respectively, undercut for the purpose of permitting the implement to give the initial "draw-cutting" contact to the surface of the lawn or ground as hereinbefore explained and shown most clearly in Fig. 1 of the drawings.

From the foregoing description, taken in connection with the accompanying drawings, the operation and advantages of our invention will be readily understood.

Having thus described one of the embodiments of our invention, what we claim and desire to secure by Letters Patent, is—

A lawn trimmer, comprising a handle provided at one side with a wheel supporting plate, a supporting wheel detachably mounted on said plate within the longitudinal plane of said handle, and a cutting and grooving member adjustably mounted on the side of said supporting plate opposite said supporting wheel and consisting of walk and lawn cutting sections each having undercut rearwardly and downwardly inclined cutting edges terminating in a horizontally extending channel shaped base section materially below the planes of said supporting plate and wheel, said lawn cutting section including a tapered forwardly projecting share portion having an acute angled draw cutting edge in advance of the cutting edge of said walk cutting section.

In testimony whereof we have affixed our signatures in the presence of two witnesses.

JOHN C. SCHULTZ.
CHARLES T. AMMON.

Witnesses:
S. C. HARRY,
W. G. PATTERSON.